US006256048B1

(12) United States Patent
Foster et al.

(10) Patent No.: US 6,256,048 B1
(45) Date of Patent: Jul. 3, 2001

(54) TWO-DIMENSIONAL VIRTUAL CAMERA

(75) Inventors: Matthew J. Foster, Mountain View; Robert S. Sargent, San Jose, both of CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/052,265

(22) Filed: Mar. 31, 1998

(51) Int. Cl.[7] .................................................. G06T 13/00
(52) U.S. Cl. ............................ 345/474; 345/473; 345/435
(58) Field of Search ................................... 345/473, 475, 345/474, 435

(56) References Cited

U.S. PATENT DOCUMENTS 5,261,041 * 11/1993 Susman ................................. 345/473

OTHER PUBLICATIONS

3D Animation Workshop: Lesson 5—Lights, Camera, Render! http:www.webreference.com/3d/lesson5/, revised Mar. 6, 1998.

3D Studio Max. vol. 2 Rendering and Animation. Kinetix, Autodesk, Inc. pp. 34–38, Mar. 15,1996.*

* cited by examiner

Primary Examiner—Mark Zimmerman
Assistant Examiner—Philip H. Stevenson
(74) Attorney, Agent, or Firm—Fish & Richardson P.C.

(57) ABSTRACT

A method of producing a frame sequence file from a two-dimensional virtual canvas includes receiving control instructions from a user and thereafter, producing frame sequence file frames by repeatedly mapping a virtual camera frame upon the virtual canvas in accordance with the control instructions, processing virtual canvas information within the mapped virtual camera frame in accordance with the control instructions, and saving the processed virtual canvas information as one frame in the frame sequence file. Additionally, the canvas artwork may be animated during frame sequence file generation.

24 Claims, 7 Drawing Sheets

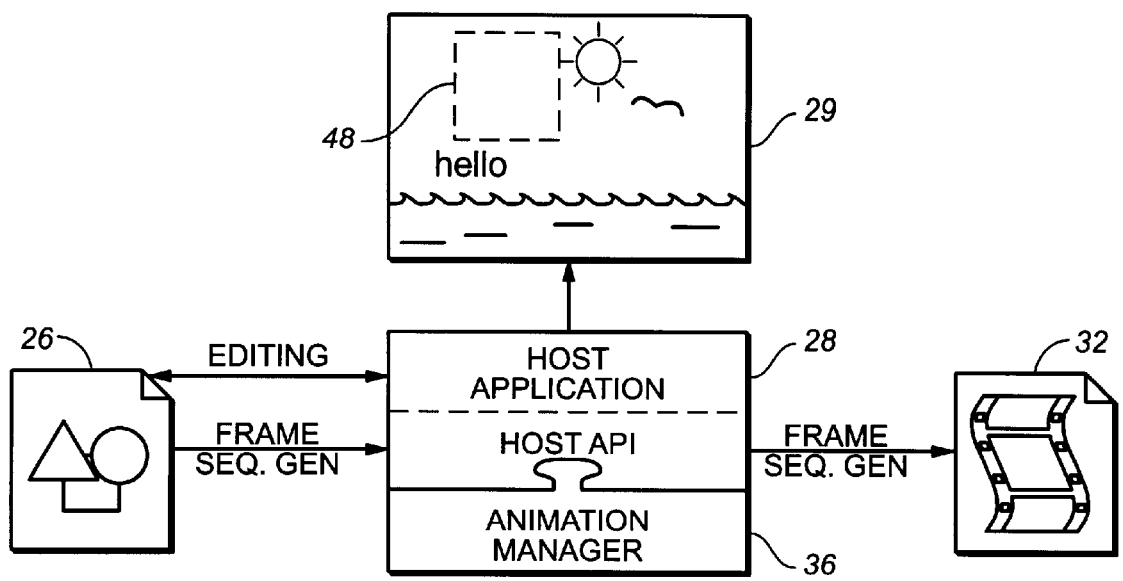
FIG._1
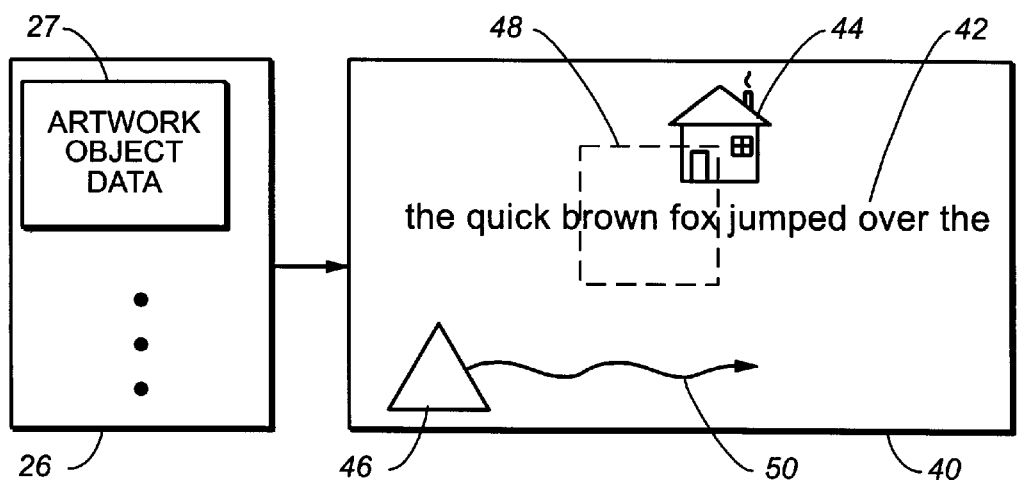
FIG._2

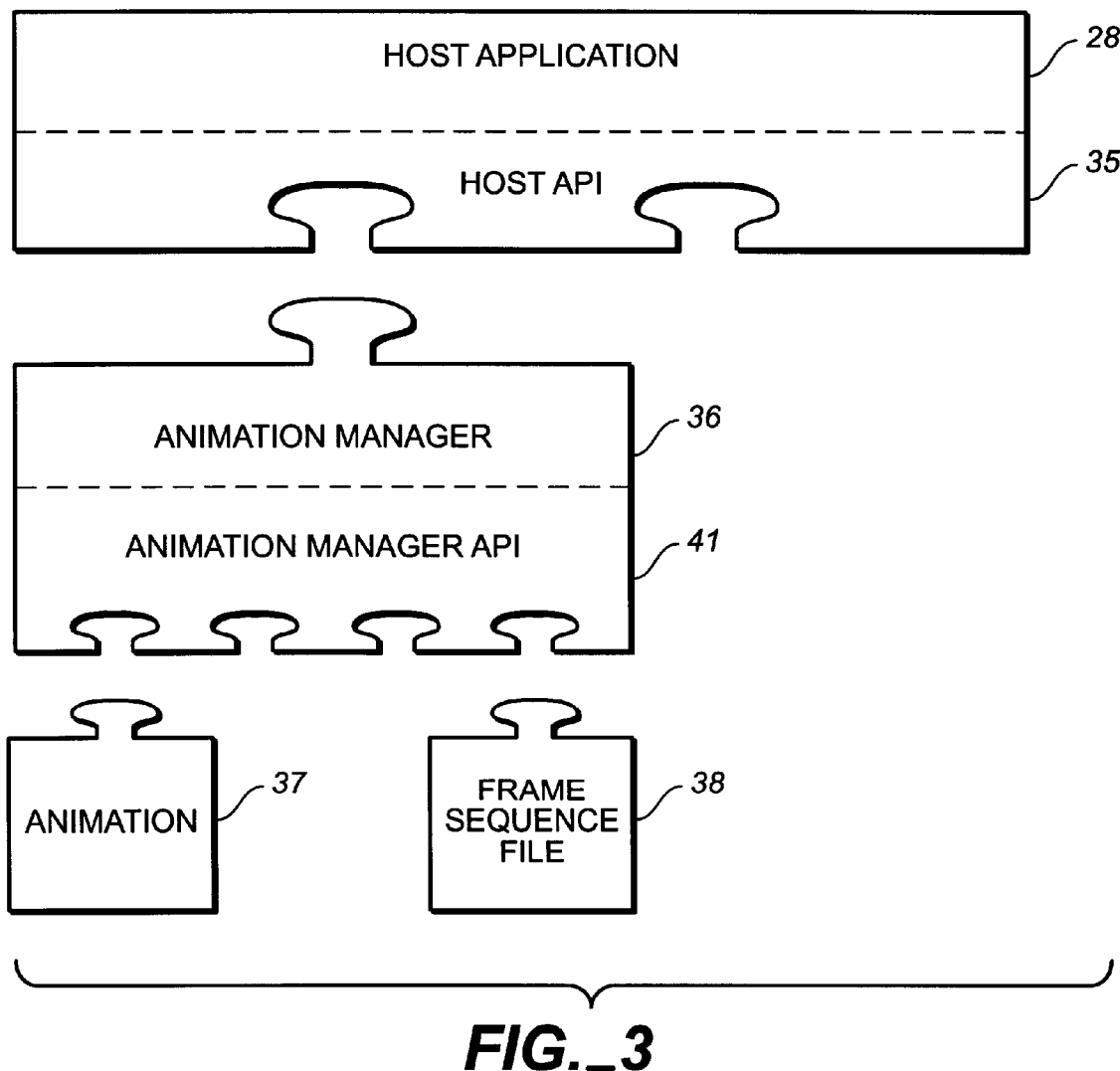
FIG._3

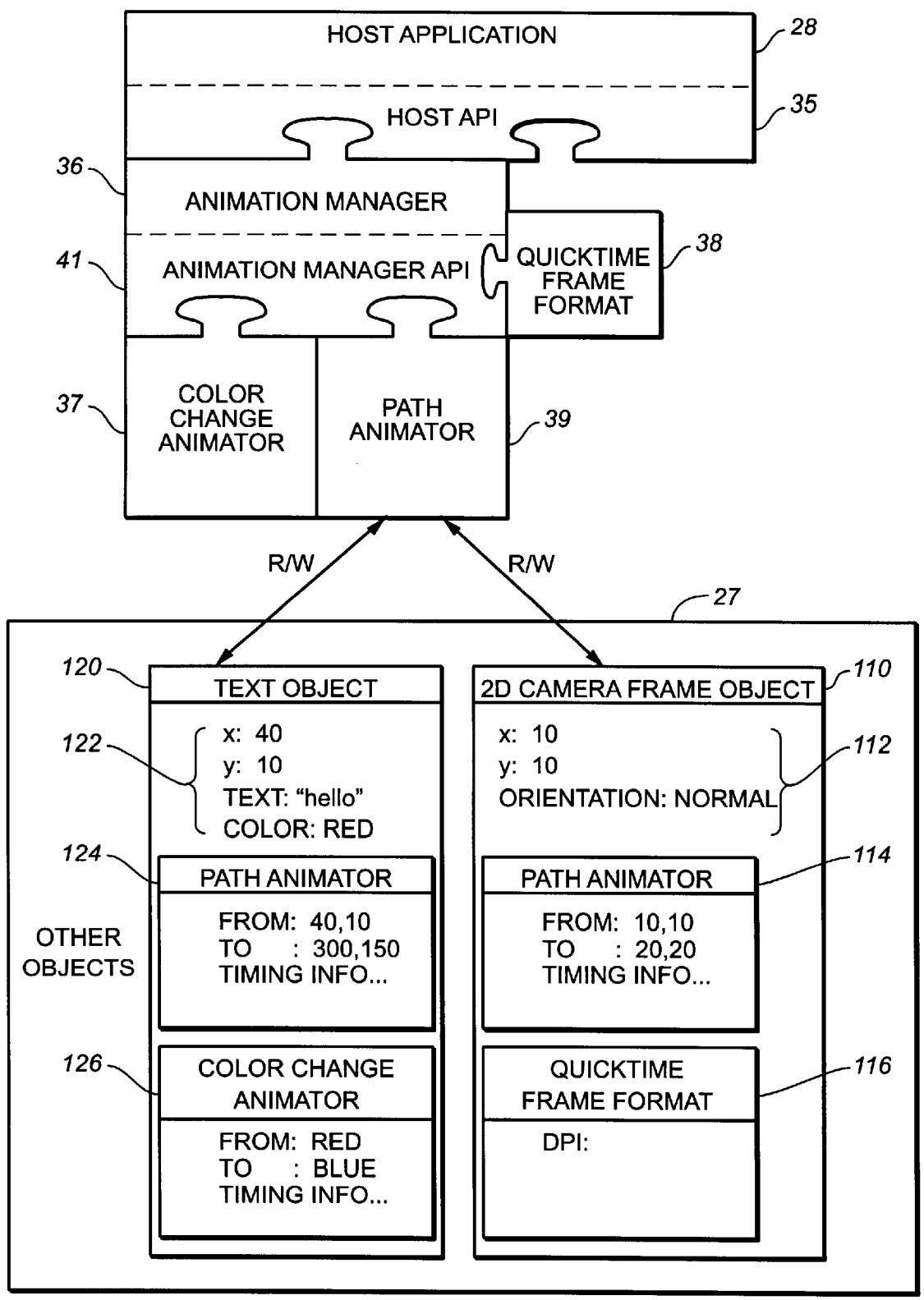
FIG._4

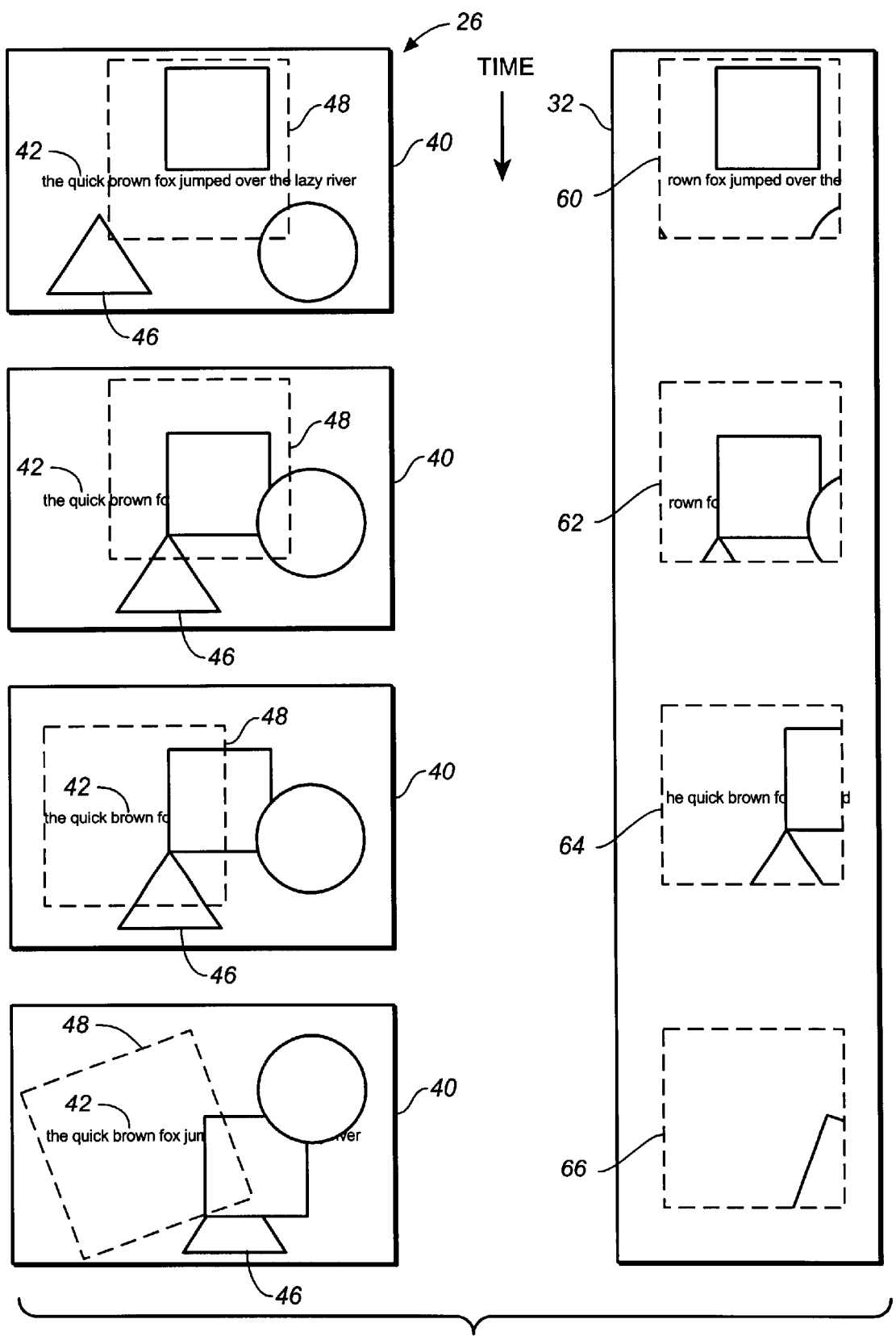
FIG._5

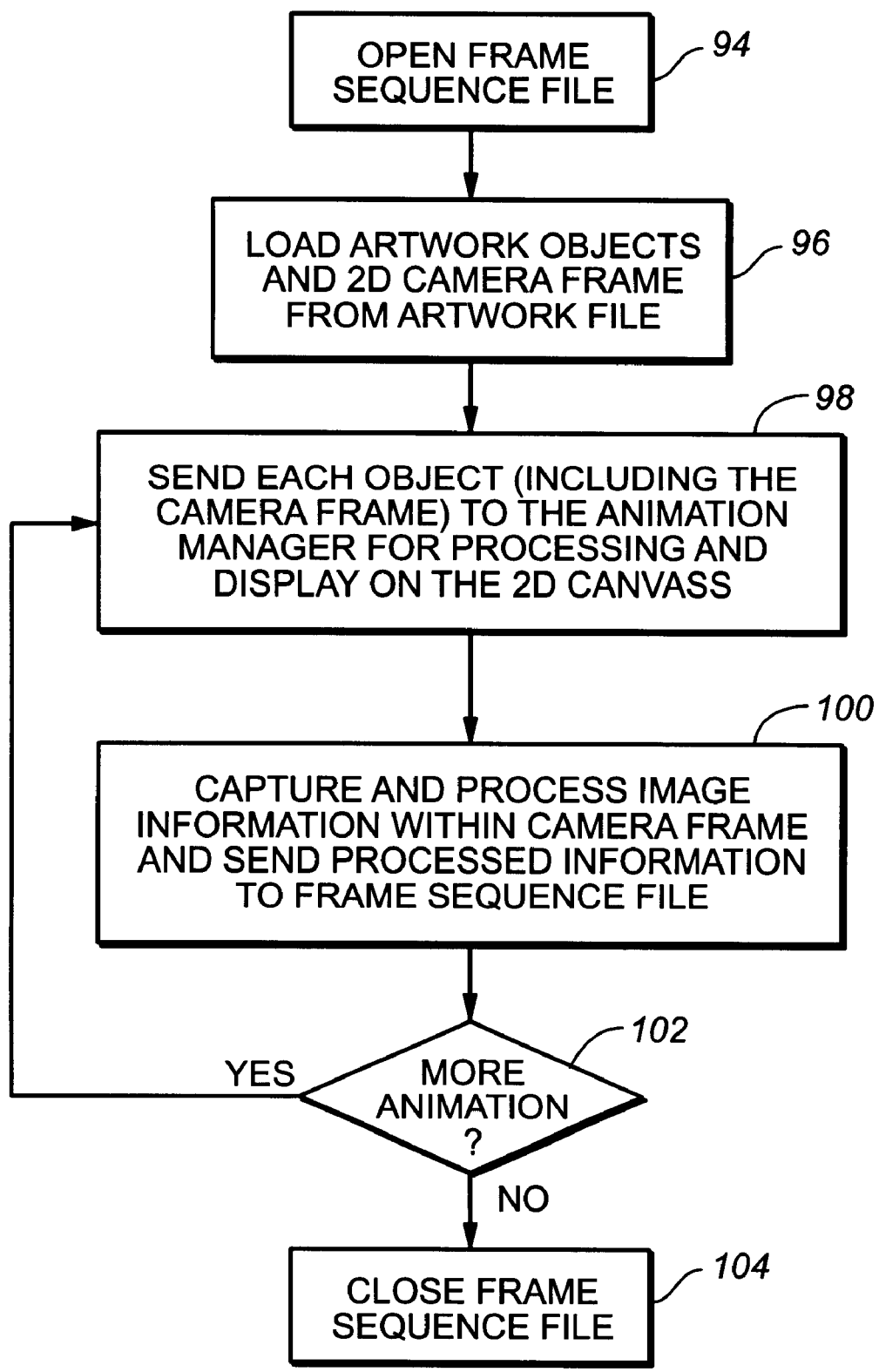
FIG._7

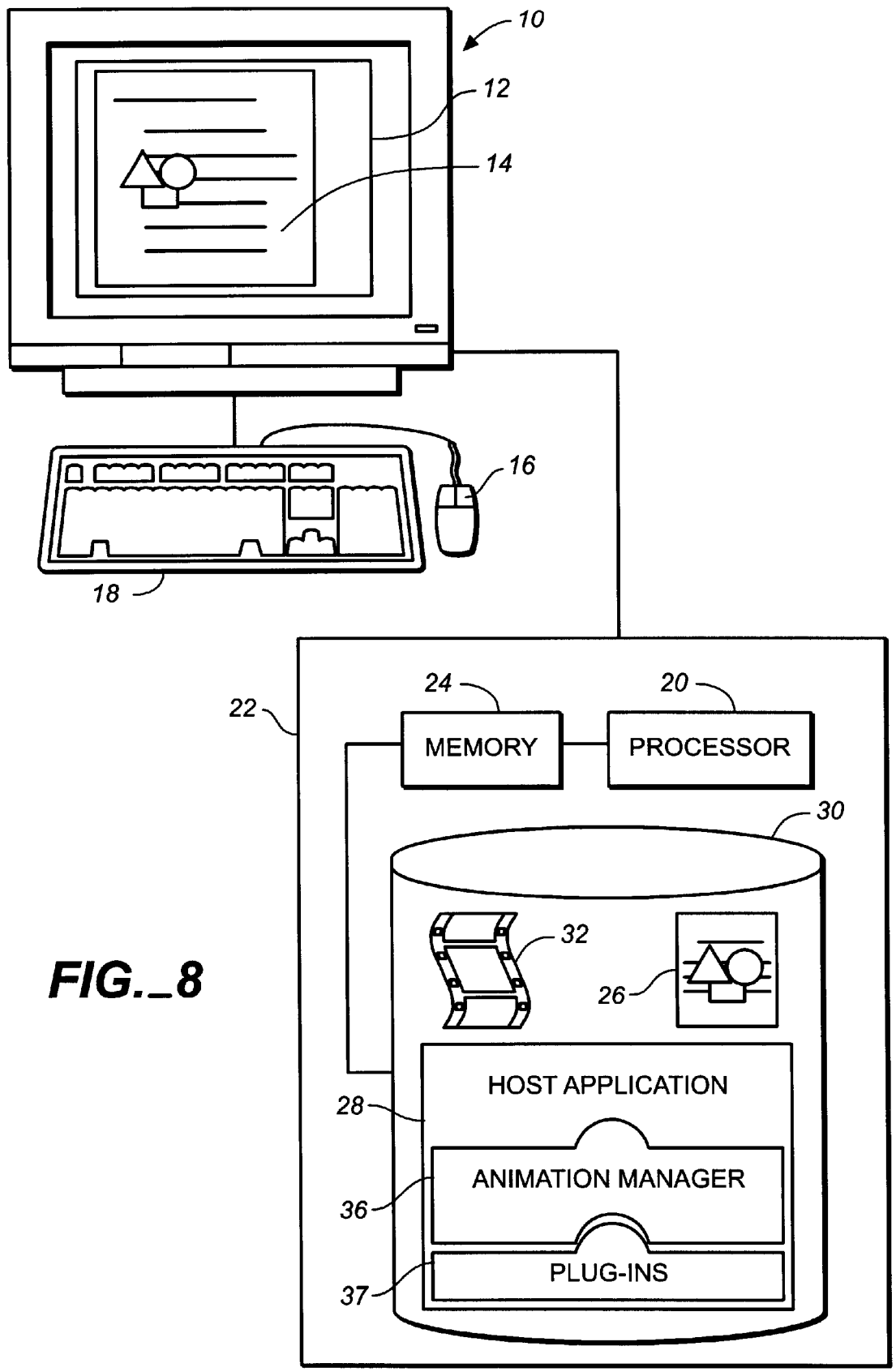
FIG._8

TWO-DIMENSIONAL VIRTUAL CAMERA

BACKGROUND

This invention relates to computer animation.

Computers can produce animated video by displaying a series of image frames from a frame sequence file, much in the way a movie projector shows movies by rapidly projecting different film frames upon a theater screen. The process of producing a computer frame sequence file, however, can be tedious. For example, a user can position artwork on a computer graphics canvas, then repeatedly save the canvas image and manually reposition artwork.

Some three dimensional (3D) art programs use a 3D virtual camera to produce frame sequence files. After positioning 3D artwork objects in 3D space, a user can maneuver the 3D virtual camera through 3D space to capture images that reflect the 3D virtual camera's position and orientation. Producing images from a 3D virtual camera can be computationally intensive. For example, determining which 3D artwork object surfaces should be visible to the 3D virtual camera can consume considerable processing resources. Often a trade-off exists between the speed of image processing and the level of detail shown in the image.

SUMMARY

In general, in one aspect, a method of producing a frame sequence file from a two-dimensional virtual canvas includes receiving control instructions from a user and thereafter, producing frame sequence file frames by repeatedly: mapping a virtual camera frame upon the virtual canvas in accordance with the control instructions, processing virtual canvas information within the mapped virtual camera frame in accordance with the control instructions, and saving the processed virtual canvas information as one frame in the frame sequence file.

Embodiments of the method may include the following features. Mapping the virtual camera frame may include transforming (e.g., translating, rotating, scaling) the virtual camera frame relative to the virtual canvas. The method may process virtual canvas information to produce special effects (e.g., scaling).

The processed virtual canvas information may be saved as a frame in a specified frame sequence file format (AVI, PICT, etc.). Such saving may be done by a frame sequence file format plug-in.

Receiving control instructions may include receiving animator assignments and potentially parameters used by these animators. Such control instructions may also include timing information.

The method may further include animating virtual canvas artwork during frame sequence file production. Such animation may be controlled by user control instructions. The control instructions that control the animation may be similar to the control instructions that control the virtual camera frame.

In general, in another embodiment, a method of producing a sequence of frames from a two-dimensional virtual canvas includes receiving animation instructions that control virtual canvas artwork, and thereafter, producing frames by repeatedly animating virtual canvas artwork in accordance with the animation instructions, receiving virtual camera frame control instructions that control a virtual camera frame, mapping the virtual camera frame upon the virtual canvas in accordance with the virtual camera frame control instructions, processing information from the virtual canvas within the mapped virtual camera frame in accordance with the virtual camera frame control instructions, and saving the processed information as one frame in a frame sequence file.

In general, in another embodiment, a method of controlling artwork that appears on a virtual canvas and a virtual camera frame that can produce a sequence of frames from the virtual canvas includes providing animators that control animation of both virtual canvas artwork and the virtual camera frame, and providing an interface that enables a user to assign animators to the virtual canvas artwork and virtual camera frame.

Embodiments of the method may include the following features. Animator plug-ins may provide the animators. The interface that permits animator assignment may be a graphical user interface.

Among the advantages of the invention are one or more of the following.

Using a two-dimensional (2D) virtual camera to capture and process images from a 2D canvas can produce 3D-like effects using fast 2D computations (e.g., simple clipping and magnification routines).

A 2D virtual camera also provides users with the ability to position and manipulate artwork "off camera." That is, image information can be represented on the canvas yet not appear within a canvas region bounded by the 2D virtual camera, easing frame sequence file production.

Additionally, handling the 2D virtual camera in the same manner as other artwork objects (e.g., assigning animators) provides an intuitive and generalized method of producing frame sequence files.

Other features and advantages of the invention will become apparent from the following description and from the claims.

BRIEF DESCRIPTION OF THE DRAWINGS

FIG. 1 is a high-level diagram illustrating frame sequence file generation.

FIG. 2 is a diagram of a two-dimensional canvas produced by an artwork file.

FIG. 3 is a diagram of animation manager architecture.

FIG. 4 is a diagram illustrating animation manager processing of artwork file objects.

FIG. 5 is a diagram illustrating frame sequence file generation.

FIG. 7 is a flowchart of frame sequence file generation.

FIG. 8 is a diagram of a computer system platform.

DETAILED DESCRIPTION

Figure 6:
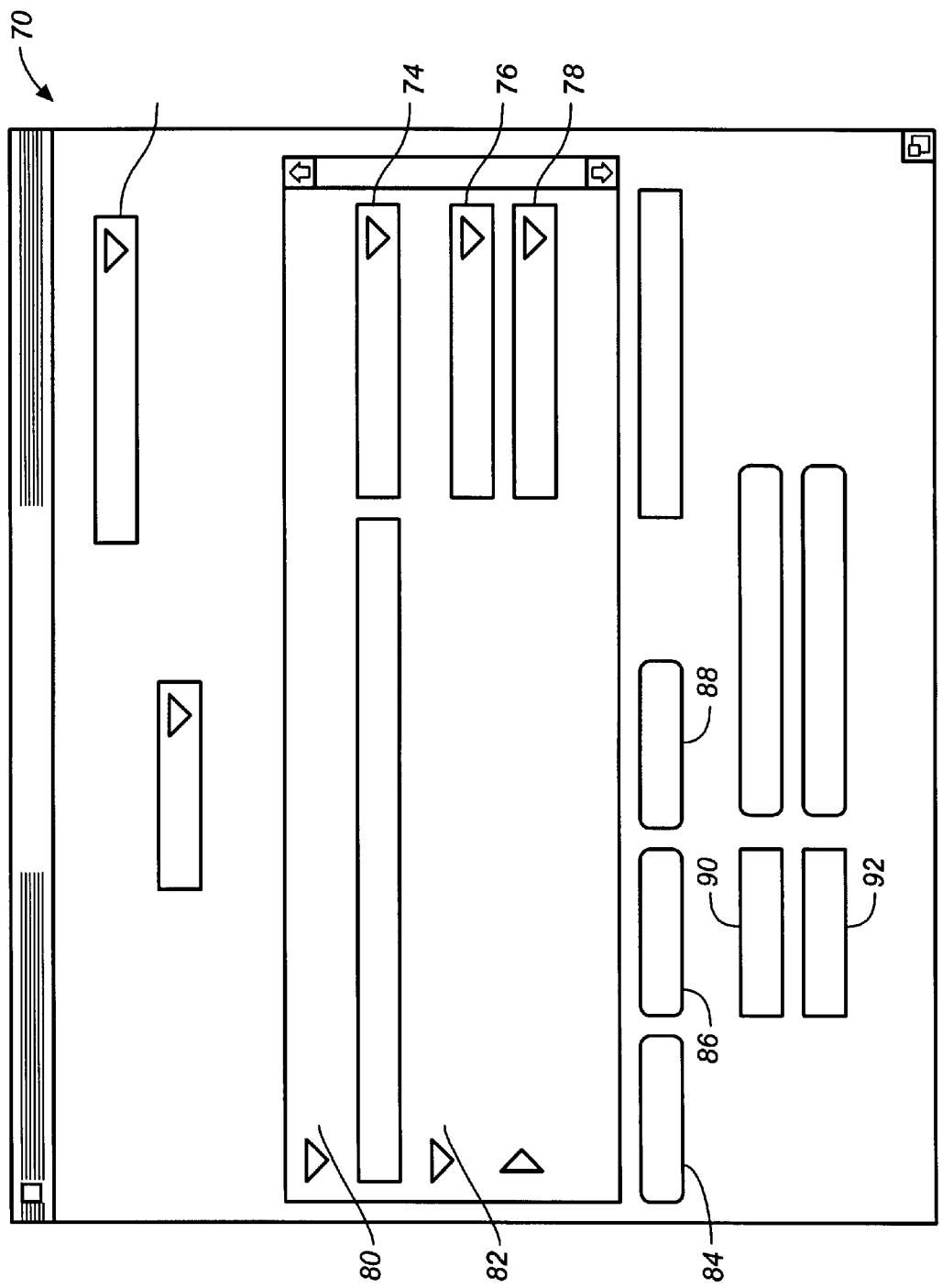
FIG. 6 is a diagram of an animation manager dialog panel.

Referring to FIG. 1, a host application 28, such as Adobe® Illustrator, enables a user to interactively produce a picture 29. The picture 29 can include different images and text. An artwork file 26 stores data that describes the picture. Integrating an animation manager 36 into host application 28 enables a user to store additional data in the artwork file 26 that the animation manager 36 can use to animate picture elements. The animation manager 36 also enables a user to store data in the artwork file 26 that controls a 2D virtual camera frame 48 (camera frame). The camera frame 48 can capture picture information at different times during picture animation to produce a frame sequence file 32 (a computer movie).

Referring to FIG. 2, an artwork file 26 stores artwork file objects 27 that produce artwork on a 2D computer graphics canvas 40 (canvas). A canvas 40 extends only in the x and y directions. Artwork file objects 27 can produce text 42, images 44, and shapes 46.

A special artwork file object is the 2D virtual camera frame 48 (camera frame). The camera frame 48 maps a region of the canvas 40. The region bounded by the camera frame 48 can be captured and processed to produce a frame for a frame sequence file 32. A user can view the canvas and a graphic representation of the camera frame 48 (e.g., a superimposed frame outline) during frame sequence file 32 generation. However, producing a frame sequence file 32 using the camera frame can occur independently of such a display.

The user can control the camera frame 48 by providing instructions before frame sequence file generation (discussed below). Alternatively, the user can manually move the camera frame 48 about the canvas 40 either in real-time or by "freezing" the canvas 40 at specified intervals. Both methods of control enable a user to mathematically transform (e.g., translate and rotate) the camera frame's 48 position on the canvas 40, remapping the region of the canvas 40 bounded by the camera frame 48.

Referring to FIG. 3, a variety of host applications 28 that include an application programming interface (API) 35 can use an animation manager plug-in 36 to generate frame sequence files. The animation manager 36 includes its own API 41 that accepts plug-in modules 37 and 38. Some plug-in modules 37 (animators) can animate artwork file objects. Other plug-ins (frame format plug-ins) support different frame sequence file formats (e.g., FlashPix, Apple QuickTime™, AVI, PICT, Animated GIF, Microsoft ActiveMovie™, Adobe Photoshop™, and Adobe Illustrator™ sequences). Though the application uses a plug-in architecture, other implementations can employ a monolithic set of routines that provide all animation features.

Animator plug-in modules 37 provide the animation manager 36 with animation routines that control the artwork file objects including the camera frame. These routines accept different user-specified parameters. For example, a color change animator provides a routine that causes an artwork file object to fade into the background. The user-specified parameters for the color change animator include the initial color, the final color, when the color change begins (e.g., how many frames into the frame sequence file), and when the color change ends.

A partial list of other animators include path (i.e., translation), scale, rotation, explode, collapse, swirl, and morph animators. Still other animators can dynamically produce and erase artwork objects. For example, an animator can read a text file and display its contents on the canvas. The animation manager 36 can also use any feature provided by the host application 28. By using different animation effects on different artwork objects, users can produce action filled frame sequence files.

Some plug-ins 37 operate only on certain classes of artwork file objects. For example, scroll, sing-a-long bouncing-ball, and perspective receding text animators operate only on text artwork objects. However, many animator plug-ins 37 operate on all types of artwork file objects including the camera frame. Thus, users can control the camera frame the same way the user controls an image moving across the canvas. This provides an easy and intuitive method of controlling the camera frame.

Frame format plug-ins 38 handle frame sequence file tasks including saving frame data in a specified frame sequence format. Different plug-ins support different frame formats. A user can specify the format of a frame sequence by assigning a frame format plug-in 38. Like animators, frame format plug-ins accept controlling parameters, for example, a parameter that controls output resolution.

The animation manager 36 provides a user-interface (described below in reference to FIG. 5) that enables a user to easily assign plug-in capabilities to artwork file objects (including the camera frame) and specify parameters. Referring again to FIG. 2, a user can assign a path animator to an artwork file object 46 to make the object travel across the canvas 40 along a specified path 50.

Referring to FIG. 4, each object 110 and 120 in an artwork file 27 can include description information 122 and 116 and plug-in references and parameters 124, 126, 112, 114. For example, text object 120 includes description information 122 that indicates the object's coordinates (40, 10) and text ("hello") for display on the canvas and other information (not shown) such as font type, font size, etc. In FIG. 4, a user has assigned a path animator 124 and a color change animator 126 to text object 120. The user has also supplied parameters for these animators that will move the text object along a path from (40, 10) to (300, 150) and change its color from red to blue at a specified rate and time interval. During generation of the frame sequence file, the animation manager 36 passes text object 120 to assigned animators 37 and 39. The animators 37 and 39 read the object's 120 description information and plug-in parameters (e.g., path animator 124 and color change animator 126 data) and update the object's description information 122. For example, in FIG. 4, the animators will alter the text object's coordinates (e.g., change the x coordinate to some value between 40 and 300) and color (e.g., change the color to some color between red and blue). The animation manager 36 displays the object on the canvas based on the object description information 122. If the displayed object appears within the region mapped by the camera frame, the frame sequence file will show the traveling, color changing object as it travels across the camera frame.

The camera frame object 110 also includes description information 116, though different from the description information 122 that describes the text object 120. Like the text object 120, the user has assigned a path animator 37 to the camera frame object 110 and specified a path (i.e., data that instructs the camera frame to travel along a path from (10, 10) to (20, 20)). Like the text object, the plug-ins update the description 116 of the camera frame object potentially causing the camera frame to be remapped on a different portion of the canvas.

The user has also assigned a frame sequence file format plug-in 38, in this case an Apple QuickTime™ plug-in. The user has further specified parameters for the frame format plug-in 38 that includes frame resolution data (i.e., dpi).

Referring to FIG. 5, a user has assigned animators to the camera frame 48 that control its path down the canvas over time. Other animators control the camera's orientation on the canvas and different post-capture special effects (e.g., scaling the region bounded by the camera frame). In FIG. 5, the camera captures information from the canvas at four different times, producing four different frames 60, 62, 64, 66 in a frame sequence file 32. The frames reflect the camera's travel down the canvas over time and the motion of canvas artwork. Of course, the camera can remain stationary and merely capture animated and stationary artwork that appear within the camera frame.

Artwork in the frames can exist on different layers, that is, one piece can block or clip artwork on a deeper layer. Such clipping can be computed quickly without undue burden on the computer processor.

The final frame shown 66 reflects rotation of the camera and the results of scaling. Directing the camera frame to process image data by scaling (i.e., enlarging and reducing) can produce a 3D-like zooming in and out effect. The animation manager achieves this effect using simple magnification algorithms.

Referring to FIG. 6, the animation manager provides a user interface 70 that eases frame sequence file production. The user interface shown 70 includes a drop-down list control 72 that allows the user to specify a frame sequence file format (e.g., Apple QuickTime™). The user-interface 70 also shows a list of artwork file objects that the animation manager will operate on during frame sequence file generation. Different buttons add 84 and remove 88 list objects.

The user interface 70 also provides a simple method of assigning animators to artwork objects and specifying animator parameters. By selecting an object on the list, the animation manager provides a pull-down menu 74, 76, and 78 of different animators that can operate on the object. For example, a user has selected a path animator from a pull-down menu 74 to move the camera frame 80 over a period of time 84 in the same manner as the user animates other artwork objects. The user can alter these parameters by entering data into parameter fields (e.g., start 90 and duration 92). The parameter fields can differ for the different animators. Multiple animators can be assigned to a single object by adding 86 more action animators to the object. Many other user-interfaces can control animation and frame sequence file generation instead of the user-interface shown.

Referring to FIG. 7, after opening a frame sequence file 94 and loading artwork file objects from the artwork file, an iterative process handles generation of the individual frames. For each frame, the animation manager sends each artwork file object (including the camera frame) to the artwork file objects' assigned plug-ins for processing 98. The animators use the object's animator parameters stored in each artwork object to determine the object's appearance and placement on the canvas. The animation manager uses animators assigned to the camera frame and frame format plug-ins to capture and process image information within the camera frame bounds 100 and send the processed information to the frame sequence file. When the iterative process finishes 102, the animation manager closes the frame sequence file 104.

Referring to FIG. 8, a computer platform 10 includes a display 12, a keyboard 18, and a digital computer 22. The digital computer 22 includes memory 24, a processor 20, a mass storage device 30, and other customary components such as a memory bus and peripheral bus (not shown).

Mass storage device 30 store the host application 28, frame sequence file 34, and artwork file 26, although these programs and data can also appear in memory 24.

The invention may be implemented in computer hardware, firmware, software, or a combination of the three. Preferably, however, implementation of apparatus of the invention includes a computer program product tangibly embodied in a computer program storage device for execution by a computer processor; and implementation of methods of the invention includes execution of method steps by a computer processor under control of a stored program executed by the processor from a randomly accessible program store to perform the functions of the invention by operating on input data and generating output. Suitable processors include, by way of example, both general and special purpose microprocessors. Generally, a processor will receive instructions and data from a read-only memory and/or a random access memory. Storage devices suitable for tangibly embodying computer program instructions include all forms of non-volatile memory, including by way of example semiconductor memory devices, such as EPROM, EEPROM, and flash memory devices; magnetic disks such as internal hard disks and removable disks; magneto-optical disks; and CD-ROM disks.

What is claimed is:

1. A method of producing a frame sequence file from a two-dimensional virtual canvas, comprising:

receiving control instructions from a user, the control instructions being operable to control a two-dimensional virtual camera frame, the camera frame being an artwork object subject to animation on the two-dimensional virtual canvas; and thereafter, producing frame sequence file frames by repeatedly:

mapping the two-dimensional virtual camera frame upon the two-dimensional virtual canvas in accordance with the control instructions, the two-dimensional virtual camera being specified by coordinates on the two-dimensional virtual canvas; and based on virtual canvas information bounded by the two-dimensional virtual camera frame, storing data for one frame in the frame sequence file.

2. The method of claim 1 wherein mapping the virtual camera frame in accordance with the control instructions comprises transforming the virtual camera frame relative to the virtual canvas.

3. The method of claim 2 wherein transforming comprises translating.

4. The method of claim 2 wherein transforming comprises rotating.

5. The method of claim 2 wherein transforming comprises scaling.

6. The method of claim 1 wherein storing data for one frame comprises special effects processing of the virtual canvas information.

7. The method of claim 6 wherein special effects processing comprises scaling.

8. The method of claim 1 wherein storing data for a frame comprises storing data in a specified frame sequence file format.

9. The method of claim 8 wherein storing data for a frame in a specified frame sequence file format comprises storing data in one of the following formats: a FlashPix, Apple QuickTime™, AVI, PICT, Animated GIF, Adobe Photoshop™, Adobe Illustrator™, or Microsoft ActiveMovie™ sequence frame.

10. The method of claim 8 wherein storing data for a frame in a specified frame sequence file format comprises sending the data to a frame sequence file format plug-in.

11. The method of claim 1 wherein receiving control instructions comprises receiving animator assignments.

12. The method of claim 11 wherein receiving control instructions comprises receiving parameters used by assigned animators.

13. The method of claim 1 wherein receiving control instructions comprises receiving timing information.

14. The method of claim 1 further comprising animating virtual canvas artwork during frame sequence file production.

15. A method of producing a sequence of frames from a two-dimensional virtual canvas, comprising:

receiving animation instructions that control virtual canvas artwork, the artwork including a two-dimensional virtual camera frame that is subject to animation on the virtual canvas; and thereafter, producing frames by repeatedly:

animating virtual canvas artwork in accordance with the animation instructions;

receiving virtual camera frame control instructions that control the two-dimensional virtual camera frame;

mapping the two-dimensional virtual camera frame upon the two-dimensional virtual canvas in accordance with the virtual camera frame control instructions, the two-dimensional virtual camera being specified by coordinates on the two-dimensional virtual canvas; and based on virtual canvas information bounded by the two-dimensional virtual camera frame, storing data for one frame in a frame sequence file.

16. A method of controlling artwork that appears on a two-dimensional virtual canvas and a two-dimensional virtual camera frame used to produce a sequence of frames from the virtual canvas, the two-dimensional virtual camera frame being an artwork object on the virtual canvas, the method comprising:

providing animation routines each operable to control animation of an artwork object on the two-dimensional virtual canvas, including animation routines operable to control the two-dimensional virtual camera frame;

providing an interface that enables a user to assign animation routines to virtual canvas artwork including the two-dimensional virtual camera frame and to specify controlling parameters for the animation routines, whereby the virtual camera frame can be controlled by animation routines like any other artwork object on the virtual canvas; and producing a frame sequence file by repeatedly:

mapping the two-dimensional virtual camera frame upon the two-dimensional virtual canvas under the control of the animation routines assigned to the two-dimensional virtual camera frame, the position of the two-dimensional camera frame being specified by coordinates on the two-dimensional virtual canvas; and based on virtual canvas information bounded by the two-dimensional virtual camera frame, storing data for one frame in the frame sequence file.

17. The method of claim 16 wherein providing animation routines comprises providing animator plug-in modules that provide animation routines to an animation manager.

18. The method of claim 17 wherein providing animation routines comprises providing animation routines that transform virtual canvas artwork or the virtual camera frame relative to the virtual canvas.

19. The method of claim 16 wherein providing an interface comprises providing a graphical user interface.

20. A computer program product that produces a frame sequence file from signals that represent a two-dimensional virtual canvas, the computer program product disposed on a computer readable medium and comprising computer program instructions for causing a computer to:

receive control instructions from a user that are operable to control a two-dimensional virtual camera frame as an artwork object subject to animation on the two-dimensional virtual canvas; and thereafter, produce frames by repeatedly executing computer program instructions that cause the computer to:

map the two-dimensional virtual camera frame upon the two-dimensional virtual canvas in accordance with the control instructions, the two-dimensional virtual camera being specified by coordinates on the two-dimensional virtual canvas; and based on the virtual canvas information bounded by the two-dimensional virtual camera frame, store data for one frame in the frame sequence file.

21. The computer program product of claim 20 wherein the computer program instructions that cause the computer to map the virtual camera frame in accordance with the control instructions comprise computer program instructions that cause the computer to transform the virtual camera frame relative to the virtual canvas.

22. The computer program product of claim 20 wherein the computer program instructions that cause the computer to store data for one frame comprise computer program instructions that cause the computer to perform special effects processing.

23. The computer program product of claim 20 wherein the computer program instructions that cause the computer to store data for a frame comprise computer program instructions that cause the computer to store data for a frame in a specified frame file format.

24. The computer program product of claim 20 further comprising instructions that cause the computer program instructions to animate virtual canvas artwork during frame production.

\* \* \* \* \*